(12) United States Patent
Metzger et al.

(10) Patent No.: US 11,167,430 B2
(45) Date of Patent: Nov. 9, 2021

(54) GRIPPING DEVICE AND SAMPLE CONTAINER PROCESSING SYSTEM

(71) Applicant: Roche Diagnostics Operations, Inc., Indianapolis, IN (US)

(72) Inventors: Jean-Claude Metzger, Uitikon (CH); Thomas Meyer, Walchwil (CH)

(73) Assignee: Roche Diagnostics Operations, Inc., Indianapolis, IN (US)

(*) Notice: Subject to any disclaimer, the term of this patent is extended or adjusted under 35 U.S.C. 154(b) by 0 days.

(21) Appl. No.: 16/542,617

(22) Filed: Aug. 16, 2019

(65) Prior Publication Data

US 2019/0366560 A1 Dec. 5, 2019

Related U.S. Application Data

(63) Continuation of application No. PCT/EP2018/053273, filed on Feb. 9, 2018.

(30) Foreign Application Priority Data

Feb. 23, 2017 (EP) .................................. 17157733

(51) Int. Cl.
*B25J 15/08* (2006.01)
*G01N 35/00* (2006.01)
*B25J 15/10* (2006.01)

(52) U.S. Cl.
CPC ........ *B25J 15/103* (2013.01); *G01N 35/0099* (2013.01); *G01N 2035/00861* (2013.01); *Y10S 901/39* (2013.01)

(58) Field of Classification Search
CPC . B25J 15/08; B25J 15/10; B25J 15/103; B25J 15/106; G01N 35/0099; G01N 2035/00861; Y10S 901/39; Y10S 294/902
(Continued)

(56) References Cited

U.S. PATENT DOCUMENTS 3,343,864 A * 9/1967 Baer ................... B25J 15/0023
294/119.3
3,386,726 A * 6/1968 Lorenz ..................... B23B 5/12
269/31
(Continued)

FOREIGN PATENT DOCUMENTS

GN 104959992 A 10/2015
WO 2011/017586 A1 2/2011
(Continued)

OTHER PUBLICATIONS

International Search Report dated Apr. 30, 2018, in Application No. PCT/EP2018/053273, 3 pp.

*Primary Examiner* — Dean J Kramer
(74) *Attorney, Agent, or Firm* — Roche Diagnostics Operations, Inc.

(57) ABSTRACT

A gripping device for handling sample containers is presented. The gripping device comprises a number of rigid fingers having non-gripping surfaces adapted to reduce adhesion between the non-gripping surfaces and labels. The number of rigid fingers collectively grip a sample container. Each finger comprises a gripping surface to contact the sample container while the sample container is gripped by the gripping device. The non-gripping surface of each finger is different from the gripping surface. The non-gripping surface of at least one of the fingers is at least partially corrugated. A sample container processing system comprising such a gripping device is also presented.

9 Claims, 3 Drawing Sheets

(58) Field of Classification Search
USPC .................................................... 294/119.1
See application file for complete search history.

(56) References Cited

U.S. PATENT DOCUMENTS

| | | | | |
|---|---|---|---|---|
| 3,981,528 | A * | 9/1976 | Andorf | B25J 15/0023 294/119.3 |
| 4,047,709 | A * | 9/1977 | Thyberg | B25B 1/2421 269/22 |
| 4,576,067 | A * | 3/1986 | Buck | E21B 19/161 269/283 |
| 5,342,254 | A * | 8/1994 | Sula | B25J 9/102 475/223 |
| 6,264,419 | B1 * | 7/2001 | Schinzel | B25J 9/023 294/119.1 |
| 7,771,188 | B2 * | 8/2010 | Dujardin | B29C 49/4205 425/526 |
| 8,011,708 | B2 * | 9/2011 | Becker | B25J 15/0226 294/196 |
| 8,851,541 | B2 * | 10/2014 | White | B25J 15/0019 294/2 |
| 9,120,233 | B2 * | 9/2015 | Moore | B25J 13/084 |
| 2010/0066109 | A1 | 5/2010 | Pedrazzini | |
| 2012/0286535 | A1 | 11/2012 | Murakami et al. | |
| 2014/0005829 | A1 * | 1/2014 | Chhatpar | B25J 9/1692 700/254 |
| 2015/0360372 | A1 * | 12/2015 | Schiettecatte | B25J 9/0015 294/197 |
| 2016/0114482 | A1 * | 4/2016 | Lessing | B25J 15/10 606/130 |

FOREIGN PATENT DOCUMENTS

| | | |
|---|---|---|
| WO | 2013/064656 A1 | 5/2013 |
| WO | 2014/131810 A1 | 9/2014 |

* cited by examiner

GRIPPING DEVICE AND SAMPLE CONTAINER PROCESSING SYSTEM

CROSS-REFERENCE TO RELATED APPLICATIONS

This application is a continuation of PCT/EP2018/053273, filed Feb. 9, 2018, which is based on and claims priority to EP 17157733.1, filed Feb. 23, 2017, which is hereby incorporated by reference.

BACKGROUND

The present disclosure generally relates to a gripping device and to a sample container processing system.

Sample container processing systems can typically be employed in laboratory automation systems, in which a plurality of sample containers are to be handled. Typically, each sample container comprises a sample to be analyzed by a number of laboratory stations. A typical laboratory automation system comprising a laboratory sample distribution system.

Gripping devices are typically used in sample container processing systems in order to handle sample containers, for example for loading and unloading the sample containers to and from sample container carriers and to and from laboratory stations.

In addition, sample containers can be stored in storage racks. In order to reduce space needed by such storage racks, storage racks are typically embodied in order to store sample containers with a high density.

Sample containers, which can be embodied as tubes, are typically labelled with labels containing information such as, for example, regarding the type of sample contained in the sample container and/or analytical operations to be performed with the sample. It has been found that labels tend to at least partially peel off. Thus, in high-density storage racks a gripping device may not have enough space to grip a desired sample container without getting into contact with peeled off labels from neighboring sample containers. The peeled off labels may then stick to surfaces of gripping devices. This can lead to a malfunction of the system.

Therefore, there is a need for a gripping device that reduces the likelihood of adhesion of labels and a sample container processing system comprising such a gripping device.

SUMMARY

According to the present disclosure, a gripping device for handling sample containers is presented. The gripping device can comprise a number of rigid fingers configured to collectively grip a sample container. Each finger can comprise a gripping surface configured to contact the sample container while the sample container is gripped by the gripping device. Each finger can comprise a non-gripping surface being different from the gripping surface. The non-gripping surface of at least one of the fingers can be at least partially corrugated In accordance with one embodiment of the present disclosure, a sample container processing system is also presented. The sample container processing system can comprise a number of racks for holding a plurality of sample containers. Labels can be attached to the sample containers. The sample container processing system can comprise an above gripping device.

Accordingly, it is a feature of the embodiments of the present disclosure to provide a gripping device that reduces the likelihood of adhesion of labels and a sample container processing system comprising such a gripping device. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
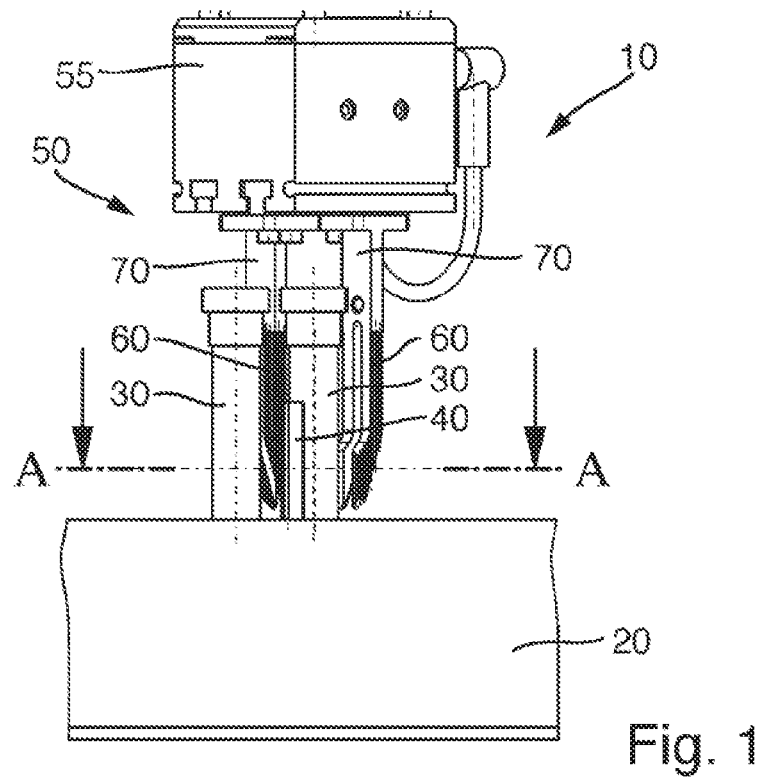
FIG. 1 illustrates a sample container processing system according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A gripping device for handling sample containers is presented. Labels can be adhered to the sample containers. This is a typical situation of handling sample containers. The labels can typically be adhered by specific adhesives on one side of the label while the other side of the label may not be provided with adhesives and can typically contain visible information.

The gripping device can comprise a number (e.g., 2 to 8, and, typically, 4) of fingers configured to collectively grip a sample container. The fingers may also be configured to collectively release the sample container. This can allow for gripping or holding and also for releasing a sample container. The sample container can typically be gripped when it needs to be manipulated by the gripping device.

Each finger can comprise a gripping surface configured to contact the sample container while the sample container is gripped by the gripping device. Each finger can comprise a non-gripping surface that is different from the gripping surface.

The non-gripping surface of at least one of the fingers can be at least partially structured to reduce a protruding contact area of the non-gripping surface. By the structured non-gripping surface having a reduced protruding contact area, the likelihood of adhesion of a label to the non-gripping surface of a finger can be reduced since the protruding contact area forming the resulting contact area to a label can be reduced thus reducing the adhering force accordingly. Consequently, adhesion of labels of sample containers placed adjacent to the gripped sample container such as, for example, placed in a rack having a high storage density, to the finger can be minimized in order to prevent malfunction of a system.

A gripping device for handling sample containers is disclosed. The gripping device can comprise a number of fingers configured to collectively grip a sample container. Each finger can comprise a gripping surface configured to contact the sample container while the sample container is gripped by the gripping device. Each finger can comprise a non-gripping surface that is different from the gripping surface. The non-gripping surface of at least one of the fingers can be at least partially corrugated. This can provide for easy manufacturing and has been proven suitable for typical applications.

A respective finger may be embodied as a rigid finger. The rigid finger may bend in a negligible manner when a sample container is gripped by the gripping device. In one embodiment, the bending or beam deflection of the rigid finger can be less than about 0.5 mm when a sample container is gripped by the gripping device. The rigid finger may be designed such that, for example, a force having a value of about 10 Newton applied to the rigid finger can result in a bending or beam deflection of the rigid finger less than about 0.5 mm. A value of a bending stiffness of the rigid finger may be larger than about 1,000,000 Newton*$mm^2$.

The gripping device may comprise a manipulating head configured to move the fingers during a gripping or release operation. The manipulating head may be configured to move the fingers only laterally, i.e., without any rotatory component. The manipulating head may be configured to move the fingers from a gripping position to a release position and vice versa without bending the fingers.

The non-gripping surfaces of all fingers may be partially structured or fully structured. The non-gripping surfaces of all fingers may be partially corrugated or fully corrugated.

The gripping device may comprise a number (e.g., 2 to 4) of finger supports. Two fingers can be coupled to a corresponding finger support. The finger support and the fingers may be embodied as one piece. The finger supports may be movable relative to each other. This can allow for gripping and releasing operation by the fingers.

According to one embodiment, all gripping surfaces of the fingers can face towards a common center. Typically, a sample container may be gripped and held in this common center.

According to one embodiment, some or all of the gripping surfaces of the fingers can be sand blasted. This can allow for increased gripping action towards the sample container.

In one embodiment, the corrugated surfaces of the fingers can be embodied by a succession of grooves and/or serrations. The groves and/or serrations may extend longitudinally and/or transversely. The grooves and/or serrations may comprise a groove width in the range of about 0.5 mm to about 5 mm. In one embodiment, the groove width can be about 1.4 mm. A groove distance between adjacent grooves may be in the range of about 0.6 mm to about 5.5 mm. In one embodiment, the groove distance can be about 1.5 mm. A length of the grooves and/or serrations may be in the range of about 10 mm to about 50 mm. In one embodiment, the length of the grooves and/or serrations may be in the range of about 10 mm to about 20 mm. A thickness of the finger may be in the range of about 1 mm to about 8 mm. In one embodiment, the thickness of the finger may be about 4 mm. A width of the finger may be in the range of about 1 mm to about 8 mm. In one embodiment, the width of the finger may be about 3 mm. A length of the finger may be in the range of about 25 mm to about 75 mm. In one embodiment, the length of the finger may be in the range of about 30 mm to about 60 mm. The gripping surface of a finger may lie in the range of about 20 $mm^2$ to about 80 $mm^2$. In one embodiment, the gripping surface of a finger may lie in the range of about 40 $mm^2$ to about 60 $mm^2$.

A sample container processing system is also disclosed. The sample container processing system can comprise a number (e.g., 1 to 1000) of racks for holding a plurality of sample containers. Labels can be attached to the sample containers. The sample container processing system can further comprise a gripping device.

The rack may be used in order to hold and store sample containers. The rack can also be a rack for transporting the sample containers or for feeding the sample containers into a laboratory station or a storing device like a refrigerator. With regard to the gripping device, all embodiments and variations as discussed herein can be applied.

It should be noted that the sample containers can be regarded as part of the sample container processing system, or can alternatively be regarded as separate entities.

According to one embodiment, the racks can comprise a plurality (e.g., 30 to 100) of supports for the sample containers. The supports may be arranged in a pattern, for example, in a regular pattern, having a distance between respective centers of the supports between about 1.5 cm and about 2.5 cm. The distance may also be about 2 cm. Such dimensions have been proven suitable for typical applications, as they can provide for densely packed sample containers. It has also been observed that with such dimensions adhesion of labels to fingers of gripping devices can have an increased likelihood which can be reduced significantly by the disclosed gripping device.

Referring initially to FIG. 1, FIG. 1 shows a sample container processing system 10. The sample container processing system 10 can comprise a rack 20. The rack 20 can be configured to hold a plurality of sample containers 30. The sample containers 30 can be embodied as typical laboratory tubes.

On some, or all, of the sample containers 30, a respective label 40 can be adhered to. Such labels can be used to provide information such as, for example, regarding the type, origin and/or intended processing steps of a sample contained in the respective sample container 30.

The sample container processing system 10 can further comprise a gripping device 50. The gripping device 50 can comprises a conventional manipulating head 55, below which four fingers 60 can be attached to. Each finger 60 can be embodied as a rigid finger.

The fingers 60 can be grouped in two groups each comprising two fingers 60, each group of fingers being connected to a respective finger support 70. The configuration of the fingers 60 will be explained further below.

The manipulating head 55 can be configured to move the fingers 60 such that they collectively hold or release a sample container 30. The fingers 60 will be further explained with respect to FIG. 2.

Figure 2:
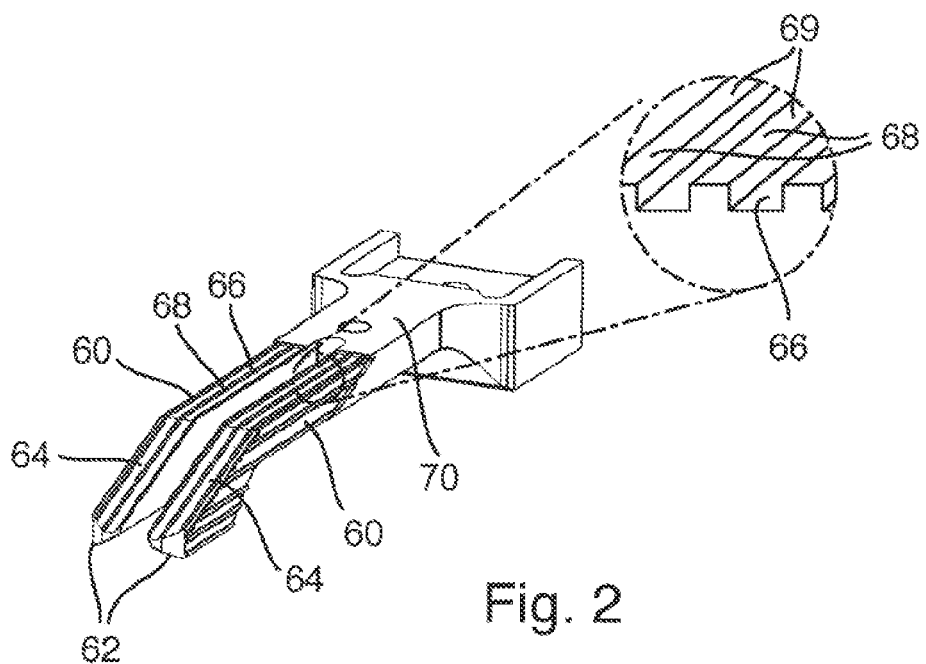
FIG. 2 illustrates two fingers of the sample container processing system according to an embodiment of the present disclosure.

FIG. 2 shows a group of two fingers 60 which can be grouped together by the finger support 70. The finger support 70 can be attached to the manipulating head 55.

Each finger 60 can comprise a respective sand blasted gripping surface 62 and a respective non-gripping surface 64. The non-gripping surface 64 may be the surface of the finger 60 except/without the gripping surface 62 or may, for example, be a surface of the finger 60 not in contact with the sample container 30.

The gripping surfaces 62 can be configured to contact a respective sample container 30 when the sample container 30 is gripped or held.

The non-gripping surfaces 64 can be partially corrugated with a succession of grooves 66 and serrations 68.

As depicted in FIG. 2 in the schematically detailed enlargement on the right side, a protruding contact area 69 of the non-gripping surface 64 can be formed by the abutting surfaces of the serrations 68. With this measure, the non-gripping surfaces 64 can be structured to reduce their protruding contact areas 69 forming contact areas to labels 40. This can reduce adhesion between the non-gripping surfaces 64 and labels 40.

Figure 3:
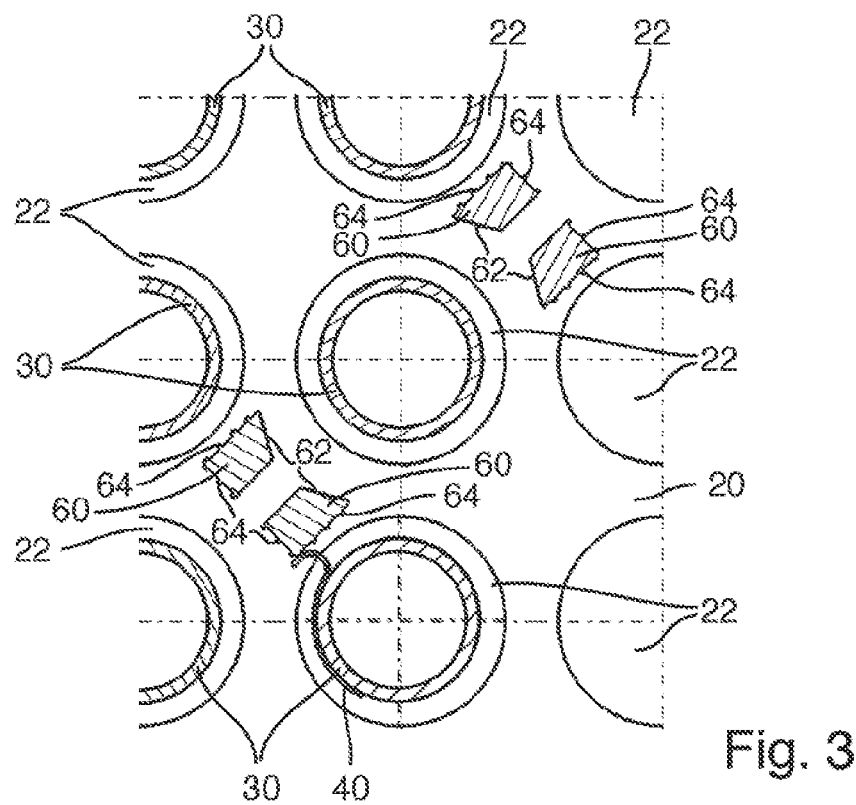
FIG. 3 illustrates a top sectional view on a rack of the sample container processing system according to an embodiment of the present disclosure.

FIG. 3 shows a typical configuration of sample containers 30 and fingers 60 along a plane which is denoted with A-A in FIG. 1.

As shown, the rack 20 can comprise a plurality of supports 22 that can be arranged in a regular pattern. Each support 22 may receive and hold a respective sample container 30. One of the shown sample containers 30 has a label 40 adhered to it.

As is shown in FIG. 3, the gripping surfaces 62 can face towards a common center in which a sample container 30 to be gripped can be located. The non-gripping surfaces 64 can face away from the common center.

FIG. 3 shows a state in which the sample container 30 is not gripped. As shown, the label 40 adhered to a neighboring sample container 30 can partially lose contact to the sample container 30 and can thus come into contact with a non-gripping surface 64 of a finger 60.

Due to the corrugation of the non-gripping surface 64, the label 40 will not adhere to the non-gripping surface 64, but will remain on the sample container 30 to which it is adhered to.

Figure 4:
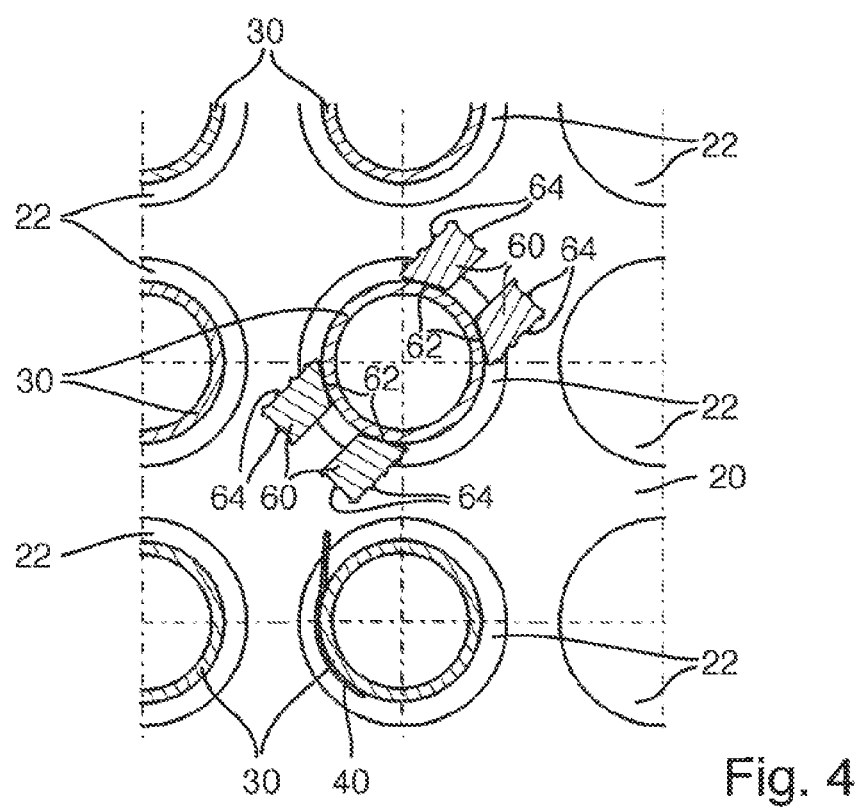
FIG. 4 illustrates a top sectional view on the rack in another state according to an embodiment of the present disclosure.

FIG. 4 shows a state in which the fingers 60 collectively grip a sample container 30. The label 40 can remain on its sample container 30. The fingers 60 can, for example, lift the sample container 30 held by the fingers 60 in order to load it onto a sample container carrier or in an analyzing station.

By the shown embodiments, the problem that the label 40 can inadvertently be removed from its sample container 30, which has often be seen in prior art configurations, can effectively be omitted.

Figure 5:
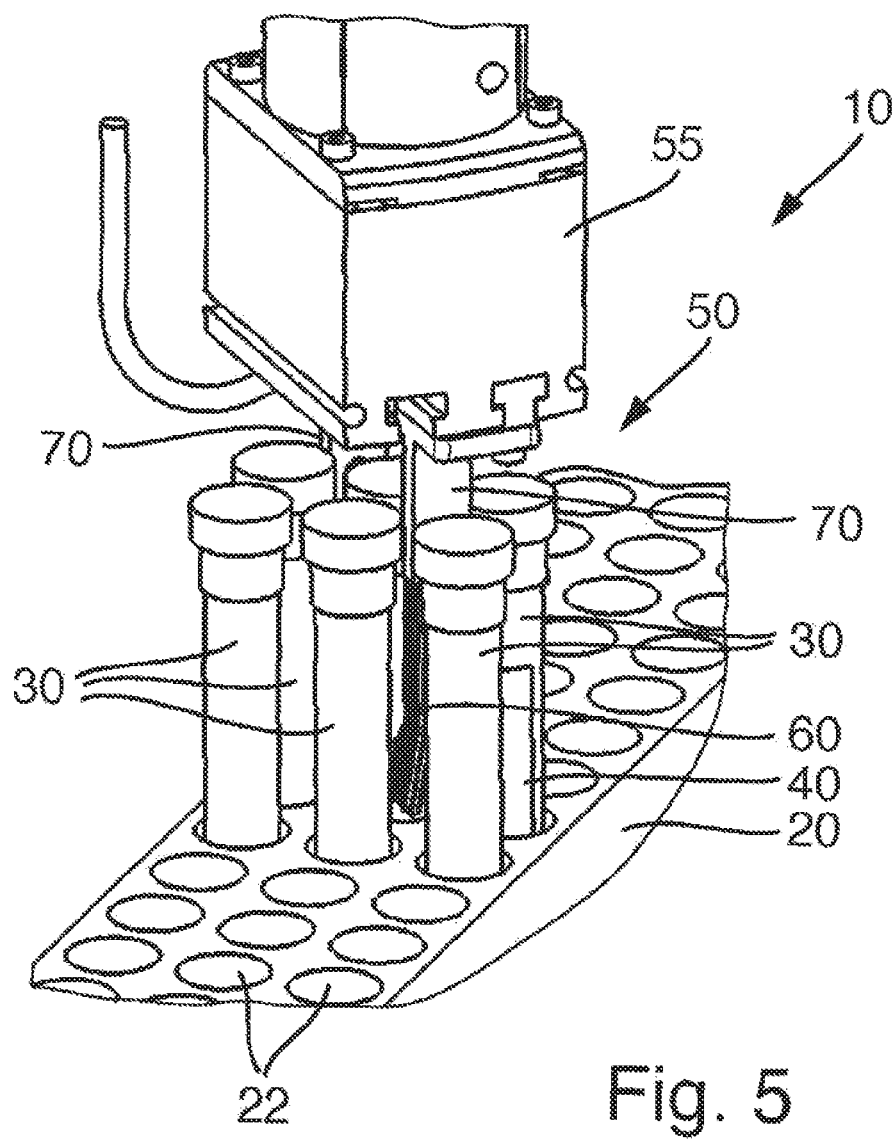
FIG. 5 illustrates the sample container processing system in a perspective view according to an embodiment of the present disclosure.

FIG. 5 shows the sample container processing system 10 in a perspective view. As can be seen, the fingers 60 can grip a sample container 30 and can lift it for specific operations.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A gripping device for handling sample containers, the gripping device comprising:
    a number of rigid non-bending fingers configured to collectively grip a sample container, wherein each finger comprises a gripping surface configured to contact the sample container while the sample container is gripped by the gripping device, wherein each finger comprises a non-gripping surface being different from the gripping surface, and wherein the non-gripping surface of at least one of the fingers is fully corrugated along the whole surface at three sides of the finger.

2. The gripping device according to claim 1, wherein the non-gripping surface of the at least one of the fingers is at least partially corrugated by a succession of grooves and/or serrations.

3. The gripping device according to claim 1, further comprises,
    a number of finger supports, wherein two fingers are coupled to a corresponding finger support.

4. The gripping device according to claim 3, wherein the finger supports are movable relative to each other.

5. The gripping device according claim 1, wherein all gripping surfaces of the fingers face towards a common center.

6. The gripping device according to claim 1, wherein some or all of the gripping surfaces of the fingers are sand blasted.

7. A sample container processing system, the sample container processing system comprising
    a number of racks for holding a plurality of sample containers, wherein labels are attached to the sample containers; and
    a gripping device according to claim 1.

8. The sample container processing system according to claim 7, wherein the racks comprise a plurality of supports for the sample containers.

9. The sample container processing system according to claim 8, wherein the supports are arranged in a pattern with a distance between respective centers of the supports between 1.5 cm and 2.5 cm.

* * * * *